April 2, 1963 A. MUSSCHOOT 3,083,811
VIBRATORY BIN FEEDER
Filed July 2, 1959 2 Sheets-Sheet 1
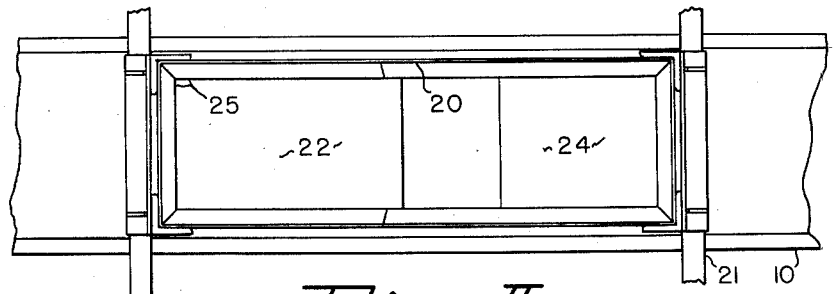
Fig. II
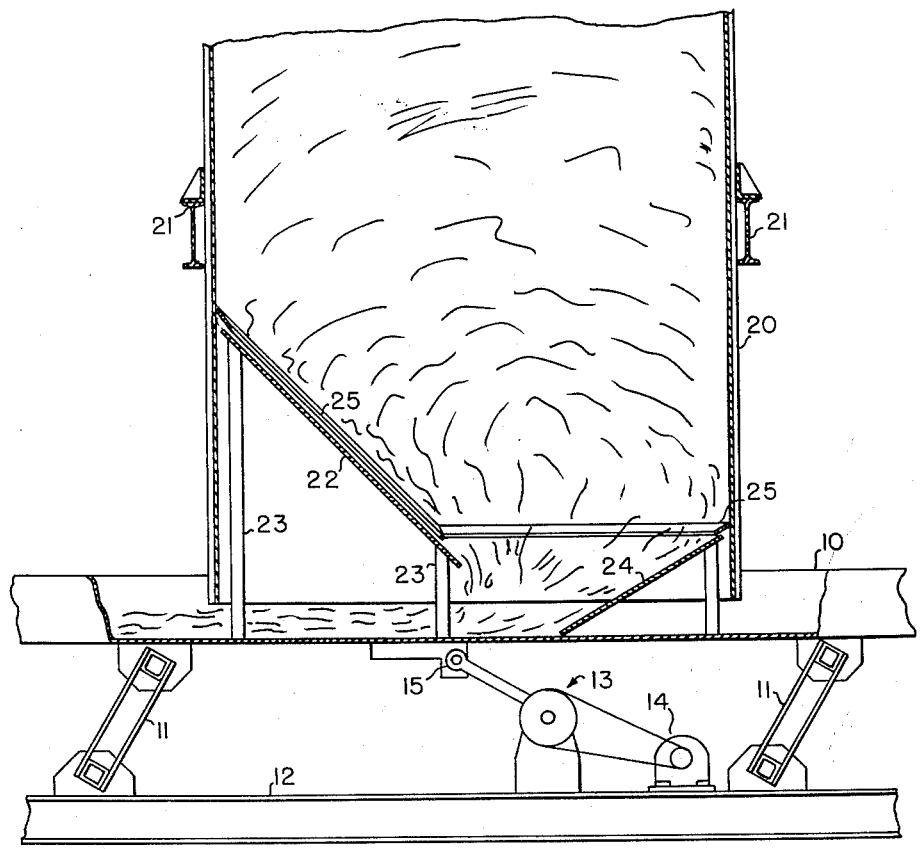
Fig. I
INVENTOR.
ALBERT MUSSCHOOT
BY
Marshall, Marshall & Yeasting
ATTORNEYS

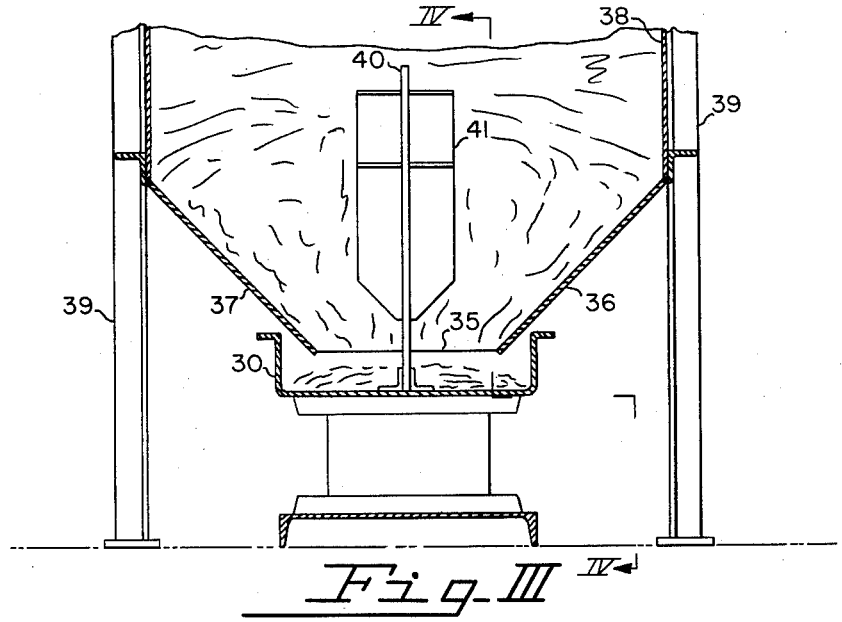
Fig. III
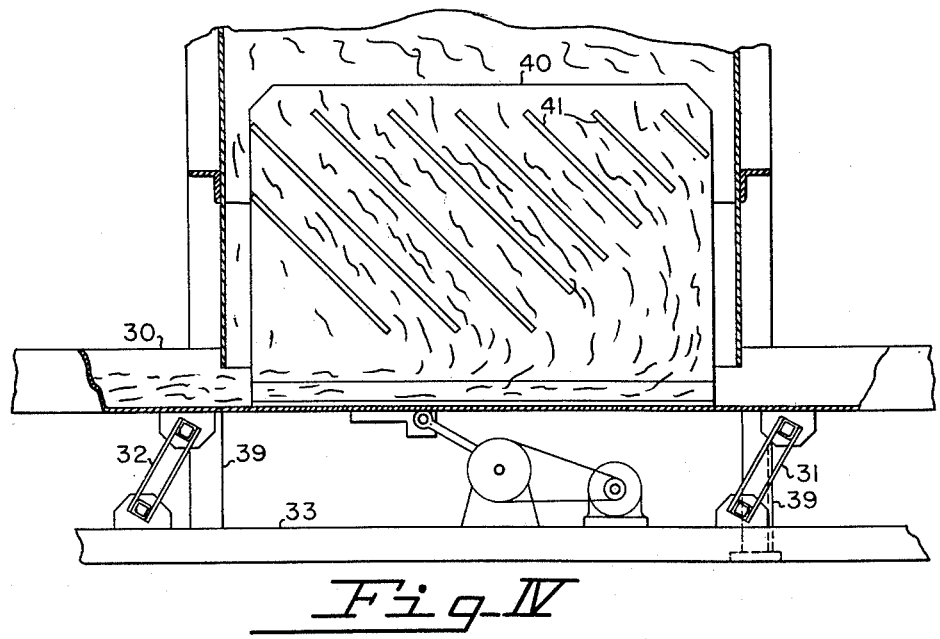
Fig. IV
INVENTOR.
ALBERT MUSSCHOOT
BY
Marshall, Marshall & Yeasting
ATTORNEYS

3,083,811
VIBRATORY BIN FEEDER
Albert Musschoot, near Louisville, Ky., assignor, by mesne assignments, to Chain Belt Company, Milwaukee, Wis., a corporation of Wisconsin
Filed July 2, 1959, Ser. No. 824,719
6 Claims. (Cl. 198—53)

This invention relates to vibratory feeding apparatus and in particular to improved structure for feeding material from the bottom end of a chute onto a vibratory conveyor.

In many industrial conveyor applications it is necessary to feed material from a hopper or chute onto a vibratory conveyor at a relatively constant rate of feed. Some materials are very difficult to feed in this manner because in their stringy or powdery condition, they form arches across the chute or hopper rather than flow evenly down through the hopper and chute. This arching effect is particularly troublesome with materials such as shredded bark, machine tool turnings, silage and powder materials such as Portland cement, lime, flour, powdered sulphur, etc. Many of these materials fall freely through a chute as long as the flow through the chute is unimpeded so that the lower particles are not stopped while in the chute. Once they are stopped, such as by filling the bottom portion of the chute, they tend to compact against each other and form relatively solid arches across the chute. When this occurs the only way in which the material may be fed is to manually or mechanically dislodge portions of the arch so as to break the arch effect and allow the material to drop.

According to the invention the flow of material from a hopper onto a vibratory conveyor is facilitated by providing a member on the conveyor that extends upwardly into the chute or hopper far enough to contact the material at the points where it tends to arch and, by the continual vibration with the conveyor, break such arches. The vibrated member extending into the chute may be a flat plate stood on edge and attached to the vibratory conveyor or it may be an inclined plate set at an angle equal to or steeper than the path of movement of the vibratory conveyor and arranged to act as a support for material in the hopper or chute and to urge such material downwardly toward the vibratory conveyor.

Preferred forms of such added plates are illustrated in the accompanying drawings.

In the drawings:

FIGURE I is a side elevation partly in section showing the lower end of a commodity chute with a vibratory conveyor forming the bottom of the chute and arranged to feed material from the chute without permitting such material to form arches.

FIGURE II is a plan view of the hopper like chute and conveyor shown in FIGURE I.

FIGURE III is a vertical section of another form of agitator plate and conveyor for feeding material from the bottom of a vertical chute or hopper.

FIGURE IV is a vertical section of the structure shown in FIGURE III as seen from the line IV—IV of FIGURE III.

These specific figures and the accompanying description are intended merely to illustrate the invention and not to impose limitations on its scope.

In one form of the invention a vibratory conveyor trough 10 is supported on parallel inclined leaf springs 11 from a base 12 and is vibrated by a crank and connecting rod mechanism 13 that is driven by a motor 14. Preferably the stiffness of the parallel leaf springs 11 and the weight of the conveyor 10 are adjusted relative to each other so that the system comprising the conveyor trough 10 and leaf springs 11 forms a tuned vibratory assembly that is resonant at the desired operating speed as determined by the motor 14 driving the connecting rod and crank assembly 13. The connecting rod of the assembly 13 is preferably pivotally mounted at a pivot point 15 attached to the conveyor trough 10 and a certain amount of resiliency is provided in such connection to minimize the transmission of vibratory shocks to the crank mechanism.

The conveyor trough 10 is located beneath the lower end of a stationary chute or hopper 20 that is rigidly supported on transverse I-beams 21 independently of the conveyor trough 10 or its base 12. The hopper or chute 20 is preferably a vertical prism in that its horizontal cross sectional shape is constant at any elevation. This shape may be either rectangular as shown or any other conventional figure including a circle.

The bottom of the hopper 20 is composed of an inclined plate 22 carried on standards 23 erected from the conveyor trough 10. The plate 22 is preferably inclined toward the conveyor trough 10 at an angle that is at least as steep as a line drawn perpendicular to the length of the inclined springs 11. The inclined plate 22 serves as a bottom for a major portion of the chute 20, the remaining portion being formed by a second inclined plate 24 that is inclined downwardly in the direction that the material is conveyed on the conveyor 10. This slope is opposite to that of the first inclined plate 22. Narrow aprons 25 attached to the side walls of the chute 20 slightly overlap or overlie the marginal area of the inclined plates 22 and 24 so as to prevent material from dropping through the spaces between edges of the inclined plates and the side walls of the hopper.

In the structure, as illustrated in FIGURES I and II, material is conveyed from right to left on the conveyor trough 10 since the conveyor trough 10 is guided for vibratory movement in a direction inclined upwardly toward the left in the figure. The angle from the horizontal at which the conveyor trough 10 moves in its vibratory motion is commonly called the angle of attack and in conventional conveyors usually has a value in the order of 30 degrees. The inclined plate 22 that is mounted on the conveyor deck 10 is inclined to the conveyor deck at an angle that is at least equal to the angle of attack. Preferably it is inclined at an angle slightly steeper. If the inclined plate 22 is parallel to the angle of attack it merely slides back and forth with the vibratory motion of the conveyor under the load of material in the hopper and only the friction between the plate 22 and the material is effective in causing any movement of the material.

If the inclined plate 22 is slightly steeper than the angle of attack it actually projects the material free of its surface at least momentarily during the lower end of the path of the vibratory motion so that the plate 22 acts as a vibratory conveyor in itself to convey material downwardly along its upper surface.

As the material flows downwardly under the conveying action of the inclined plate 22 and reaches its lower edge, which is elevated a short distance above the bottom of the conveyor trough 10, the material drops to the conveyor trough and then flows beneath the edge of such inclined plate 22 and toward the left at a rate of flow determined by the frequency and amplitude of vibration of the conveyor trough 10. The second plate 24, also inclined to the bottom of the conveyor 10, while not essential, provides some conveying action to even the flow of material from the hopper onto the conveyor 10.

With stringy materials or materials tending to arch readily fed to the hopper 20, the material next to the plate 22 tends to flow downwardly beneath the remaining material so as to keep the material in the lower left portion of the hopper 20 constantly in motion and thus prevent any arching of the material. Actually with stringy materials this circulating motion with the material next to the inclined plate 22 moving downwardly beneath the remaining material becomes quite pronounced and the majority of the feed onto the conveyor trough 10 occurs right at the lower edge of the inclined plate 22.

In providing this circulating motion to inhibit the formation of arches in the material it is important that the side wall of the hopper 20 opposite the inclined plate 22 be free of horizontal motion and preferably be stationary in space so that there is relative motion between the inclined plate 22 and the opposite side wall. If there is no such relative motion some materials may arch across and move bodily with the side walls without being sufficiently disturbed to feed downwardly onto the conveyor. This is a condition that occasionally occurs in tapered side wall hoppers mounted directly on a vibratory conveyor.

Another form of the invention suitable for use where the hopper is quite tall is illustrated in FIGURES III and IV. As shown in these figures a conveyor trough 30 that is supported on inclined leaf springs 31 and 32 from a base 33 passes longitudinally below a slot 35 between converging downwardly inclined side walls 36 and 37 forming the bottom of a tall hopper or silo 38 that is supported independently of the conveyor on legs 39. In this arrangement most of the weight of the material in the hopper 38 is carried on the downwardly inclined converging walls 36 with only a portion of the material bearing on the conveyor 30.

While this arrangement is desirable in eliminating the head load or weight of the material in the hopper from the conveyor so as not to overload the conveyor it suffers from the disadvantage that many materials tend to arch across from one inclined side wall or bottom wall to the other and thus the material refuses to flow evenly out of the slot 35. This arching is broken up by a vertical plate 40 that is mounted on the conveyor trough 30 to extend upwardly through the slot 35 to a height at least equal to the height of the tops of the inclined bottom walls 36 and 37 of the hopper. The vertical plate 40 may, as desired, be provided with laterally extending inclined vanes 41 that are inclined at an angle generally perpendicular to the length of the conveyor supporting springs 31 or 32 and preferably at an angle somewhat steeper than such line so as to serve as vibratory conveyors urging material in the hopper to flow downwardly along the sides of the vertical plate 40 and thence through the slot 35 and onto the bed of the conveyor 30.

In the structures shown in FIGURES I and II, as well as that shown in FIGURES III and IV, the vibratory motion of the conveyor decks that is imparted to the plates extending upwardly into the chute or hopper agitate the material in the hopper to promote its flow to the conveyor in a relatively uninterrupted stream and inhibit or entirely prevent the formation of arches in the material tending to obstruct the flow of material. Thus, these improved agitating means driven by the conveyor permit uniform feeding of material from vertical hoppers onto vibratory conveyors regardless of the tendency of the material to clog or arch in the hopper.

Various modifications may be made in the specific details of the structure without departing from the spirit and scope of the invention.

Having described the invention, I claim:

1. In apparatus for feeding material from a hopper, in combination, a chute having generally vertical side walls and converging stationary bottom portions defining an exit slot therebetween, a vibratory conveyor positioned directly below and generally parallel to the exit slot, and a rigid member rigidly attached to the conveyor and extending upwardly through said slot into said chute to a level at least equal to the height of said converging bottom portions, and at least one vane on the rigid member extending generally parallel to the path of vibration of the vibratory conveyor.

2. An apparatus according to claim 1 in which the rigid member includes vanes along its sides.

3. An apparatus according to claim 1 in which at least one vane is provided on the rigid member, said vane being inclined from the conveyor in the same direction as and at a greater angle than the path of vibration of the conveyor.

4. In apparatus for feeding material from a hopper, in combination, a stationary chute having at least one generally vertical side wall, a vibratory conveyor positioned beneath said chute with the conveyor forming at least a portion of the bottom of the chute, and an inclined plate mounted transversely on the conveyor and cooperating with said vertical side wall to form opposing sides of a downwardly converging channel opening into the conveyor, said inclined plate being arranged on the conveyor at an inclination that is in the same direction as but steeper than the path of vibratory motion of the conveyor, whereby the pressure between said plate and material in the channel between the plate and the vertical wall decreases as the conveyor moves forwardly and upwardly and increases as the conveyor moves downwardly to urge material onto the conveyor.

5. In apparatus for feeding material from a hopper, in combination, a vibratory conveyor that is vibrated along an inclined path and that has a receiving end beneath the hopper, a chute from the hopper to the conveyor having a generally vertical side wall adjacent the upstream end of the vibratory conveyor, and an inclined plate mounted on the conveyor and extending into the chute, said plate cooperating with said generally vertical wall to form a downwardly converging channel and having its lower edge extending transversely of and spaced from the bottom of the conveyor, said plate being inclined in the direction of but steeper than said inclined path whereby material in the channel is vibratorily conveyed toward the conveyor by vibratory movement of the conveyor.

6. In apparatus for feeding material through a chute extending downwardly from a hopper, in combination, a vibratory conveyor adapted to receive material from the chute, means for vibrating the conveyor along an inclined path, and a plate mounted transversely on the conveyor and adapted to extend upwardly into the chute, said plate being inclined in the same direction as and steeper than said inclined path and having its lower edge spaced from the bottom of the conveyor and having its material contacting face spaced from and opposing a generally vertical side wall of the chute, whereby the plate is adapted to cooperate with the side wall of the chute to form a downwardly converging channel through which material is vibratorily conveyed onto the conveyor.

References Cited in the file of this patent
UNITED STATES PATENTS

| | | |
|---|---|---|
| 325,788 | Cottrell | Sept. 8, 1885 |
| 1,075,040 | Kelly | Oct. 7, 1913 |
| 1,913,767 | Mills | June 13, 1933 |
| 2,446,752 | Fiddyment | Aug. 10, 1948 |